United States Patent [19]

Porter et al.

[11] Patent Number: 5,622,616
[45] Date of Patent: Apr. 22, 1997

[54] HYDROCONVERSION PROCESS AND CATALYST

[75] Inventors: Michael K. Porter, Beaumont; Glenn A. Clausen, Nederland, both of Tex.

[73] Assignee: Texaco Development Corporation, White Plains, N.Y.

[21] Appl. No.: 380,211

[22] Filed: Jan. 30, 1995

Related U.S. Application Data

[63] Continuation of Ser. No. 907,880, Jul. 2, 1992, abandoned, which is a continuation-in-part of Ser. No. 798,300, Nov. 22, 1991, which is a continuation-in-part of Ser. No. 694,591, May 2, 1991, abandoned.

[51] Int. Cl.$^6$ ....................................... C10G 47/02
[52] U.S. Cl. .................. 208/108; 208/110; 208/112; 208/111; 208/420
[58] Field of Search ................................. 208/110, 111, 208/112, 213, 216, 217, 108, 420

[56] References Cited

U.S. PATENT DOCUMENTS

| 4,066,530 | 1/1978 | Aldridge et al. | 208/112 |
| 4,578,181 | 3/1986 | Derouane et al. | 208/110 |
| 5,108,581 | 4/1992 | Aldridge et al. | 208/108 |

*Primary Examiner*—Helane E. Myers
*Attorney, Agent, or Firm*—Henry Gibson; James L. Bailey; Harold J. Delhommer

[57] ABSTRACT

Hydroconversion of heavy hydrocarbon oils using solid heterogeneous catalyst and small amounts of oil-miscible compound, like molybdenum naphthenate, improves total pore volume properties of the catalyst.

12 Claims, No Drawings

HYDROCONVERSION PROCESS AND CATALYST

CROSS-REFERENCES TO RELATED APPLICATIONS

This is a continuation of application Ser. No. 07/907,880 filed Jul. 2, 1992 now abandoned, which application is a continuation-in-part of U.S. patent application Ser. No. 07/798,300, filed Nov. 22, 1991, which is a continuation-in-part of U.S. patent application Ser. No. 07/694,591, now abandoned, filed May 2, 1991, the texts of both of which are incorporated herein by reference.

BACKGROUND OF THE INVENTION

1. Field of the Invention

This invention relates to the hydroconversion of heavy hydrocarbon oils. More particularly, it relates to a hydrotreating catalyst system with improved cumulative pore volume properties and to processes for producing and using such material.

2. Description of Related Information

In petroleum refining there is frequently a need to convert high boiling fractions of petroleum distillates, such as vacuum resid, to lower boiling fractions which are of higher value and more readily handleable and/or marketable. The following patents illustrate various ways of dealing with this need.

U.S. Pat. No. 4,579,646 discloses a bottoms visbreaking hydroconversion process wherein hydrocarbon charge is partially coked, and the coke is contacted within the charge stock with an oil-soluble metal compound of a metal of Group IV-B, V-B, VII-B, or VIII to yield a hydroconversion catalyst.

U.S. Pat. No. 4,226,742 discloses catalyst for the hydroconversion of heavy hydrocarbon oils formed in situ from oil-soluble metal compound by heating in the presence of hydrogen. Oil soluble metal compound is added in amounts 10–950 ppm, preferably 50–200, to feedstock. This mixture is converted to a solid, noncolloidal form by heating the mixture at 325°–415° C. in the presence of hydrogen gas. Hydroconversion is effected at 26°–482° C. and then the catalytic solids are separated from the hydroconversion effluent.

U.S. Pat. No. 4,178,227 discloses upgrading heavy carbonaceous feeds by slurry hydroconversion and fluid coking gasification, using as catalyst which is an in situ-formed metal compound, and with recycled solid fines.

U.S. Pat. No. 4,724,069 discloses hydrofining in the presence of a supported catalyst bearing a VI-B, VII-B, or VIII metal on alumina, silica, or silica-alumina. There is introduced with the charge oil, as additive, a naphthenate of Co or Fe.

U.S. Pat. No. 4,567,156 discloses hydroconversion in the presence of a chromium catalyst prepared by adding a water-soluble aliphatic polyhydroxy compound (such as glycerol) to an aqueous solution of chromic acid, adding a hydrocarbon thereto, and heating the mixture in the presence of hydrogen sulfide to yield a slurry.

U.S. Pat. No. 4,564,441 discloses hydrofining in the presence of a decomposable compound of a metal (Cu, Zn, III-B, IV-B, VI-B, VII-B, or VIII) mixed with a hydrocarbon-containing feed stream; and the mixture is then contacted with a "suitable refractory inorganic material" such as alumina.

U.S. Pat. No. 4,557,823 discloses hydrofining in the presence of a decomposable compound of a IV-B metal and a supported catalyst containing a metal of VI-B, VII-B, or VIII.

U.S. Pat. No. 4,557,824 discloses demetallization in the presence of a decomposable compound of a VI-B, VII-B, or VIII metal admitted with the charge and a heterogeneous catalyst containing a phosphate of Zr, Co, or Fe.

U.S. Pat. No. 4,551,230 discloses demetallization in the presence of a decomposable compound of a IV-B, V-B, VI-B, VII-B, or VIII metal admitted with the charge and a heterogeneous catalyst containing $NiAs_x$ on alumina.

U.S. Pat. No. 4,430,207 discloses demetallization in the presence of a decomposable compound of a V-B, VI-B, VII-B, or VIII metal admitted with the charge and a heterogeneous catalyst containing a phosphate of Zr or Cr.

U.S. Pat. No. 4,389,301 discloses hydroprocessing in the presence of added dispersed hydrogenation catalyst (typically ammonium molybdate) and added porous contact particles (typically FCC catalyst fines, alumina, or naturally occurring clay).

U.S. Pat. No. 4,352,729 discloses hydrotreating in the presence of a molybdenum blue solution in polar organic solvent introduced with the hydrocarbon charge.

U.S. Pat. No. 4,338,183 discloses liquefaction of coal in the presence of unsupported finely divided metal catalyst.

U.S. Pat. No. 4,298,454 discloses hydroconversion of a coal-oil mixture in the presence of a thermally decomposable compound of a IV-B, V-B, VI-B VII-B, or VIII metal, preferably Mo.

U.S. Pat. No. 4,134,825 discloses hydroconversion of heavy hydrocarbons in the presence of an oil-soluble compound of IV-B, V-B, VI-B, VII-B, or VIII metal added to charge, the compound being converted to solid, non-colloidal form by heating in the presence of hydrogen.

U.S. Pat. No. 4,125,455 discloses hydrotreating in the presence of a fatty acid salt of a VI-B metal, typically molybdenum octoate.

U.S. Pat. No. 4,077,867 discloses hydroconversion of coal in the presence of oil-soluble compound of V-B, VI-B, VII-B, or VIII metal plus hydrogen donor solvent.

U.S. Pat. No. 4,067,799 discloses hydroconversion in the presence of a metal phthalocyanine plus dispersed iron particles.

U.S. Pat. No. 4,066,530 discloses hydroconversion in the presence of (i) an iron component and (ii) a catalytically active other metal component prepared by dissolving an oil-soluble metal compound in the oil and converting the metal compound in the oil to the corresponding catalytically active metal component.

The above-noted U.S. patent application Ser. No. 07/694, 591 teaches that under the conditions of operation disclosed therein, such as in Examples II-IV* and related Table II in particular, it is possible to attain improvements in, for example, conversion and other factors, by adding 10–200 wppm oil-soluble catalyst to the heterogeneous catalyst. In particular, Example I shows that it is possible to attain much higher conversion when using 160 wppm of molybdenum additive.

SUMMARY OF THE INVENTION

This invention concerns a process for catalytically hydroconverting hydrocarbon oil comprising three essential steps. Step (a) involves contacting hydrocarbon oil containing a substantial quantity of high boiling compounds, boiling above about 1,000° F., in a conversion zone with (1) solid heterogenous catalyst containing hydrotreating metal on a porous support and (2) oil-miscible compound comprising an effective porosity modifying amount of metal compound. Step (b) involves converting a substantial portion of high boiling compounds in the hydrocarbon oil at conversion conditions in the presence of hydrogen and mercaptan to low boiling compounds, boiling below about 1,000° F., to make hydrocarbon oil containing a substantial portion of low boiling point compounds. Step (c) involves producing solid heterogeneous catalyst with: (1) hydrocarbonaceous deposits having a higher ratio of hydrogen to carbon; and (2) a greater cumulative pore volume; than is correspondingly produced in the absence of the oil-miscible compound.

A process is also provided for increasing the effective porosity of a solid heterogeneous catalyst in situ while catalytically hydroconverting hydrocarbon oil comprising such steps.

DETAILED DESCRIPTION OF THE INVENTION

The charge which may be treated by the process of this invention may include high boiling hydrocarbons typically those having an initial boiling point (ibp) above about 650° F. This process is particularly useful to treat charge hydrocarbons containing a substantial quantity of components boiling above about 1000° F. to convert a substantial portion thereof to components boiling below 1000° F.

Typical hydrocarbon oils include, among others, one or more of the following: heavy crude oil; topped crude; atmospheric resid; vacuum resid; asphaltenes; tars; coal liquids; visbreaker bottoms; and the like. Illustrative of such charge streams may be a vacuum resid obtained by blending vacuum resid fractions from Alaska North Slope Crude (59 vol %), Arabian Medium Crude (5 vol %), Arabian Heavy Crude (27%), and Bonny Light Crude (9 vol %) having the following characteristics:

| API Gravity | 5.8 |
|---|---|
| 1000° F.+, wt % | 93.1 |
| Composition, wt % | |
| C | 84.8 |
| H | 10.09 |
| N | 0.52 |
| S | 3.64 |
| Alcor Microcarbon Residue (McR), wt % | 19.86 |
| n-$C_7$ insolubles, wt % | 11.97 |
| Metals content, wppm | |
| Ni | 52 |
| V | 131 |
| Fe | 9 |
| Cr | 0.7 |
| Na | 5 |

The hydrocarbon oil generally contains undesirable components like: up to about 1 wt %, typically about 0.2–0.8 wt %, say 0.52 wt %, nitrogen; up to about 10 wt %, typically about 2–6 wt %, say 3.64 wt %, sulfur; and metals, such as Ni, V, Fe, Cr, Na, and others, in amounts up to about 900 wppm, typically about 40–400 wppm, say 198 wppm. The undesirable asphaltene content of the hydrocarbon oil may be as high as about 22 wt %, typically about 8–16 wt %, say 11.97 wt %, analyzed as components insoluble in normal heptane.

The API gravity of the charge may be as low as about −5, typically from about −5 to about 35, say 5.8. The content of components boiling above about 1000° F. may be as high as 100 wt %, typically about 50–98+ wt %, say 93.1 wt %. The Alcor MCR Carbon content may be as high as about 30 wt %, typically about 15–25 wt %, say 19.86 wt %.

The charge hydrocarbon oil may be passed to a hydroconversion operation wherein conversion occurs in liquid phase at any effective, including known, conversion conditions. Typical operating conditions include about 700° F.–850° F., preferably about 750° F.–810° F., say 800° F.; and hydrogen partial pressure of about 500–5000 psig, preferably about 1500–2500 psig, say 2000 psig.

A catalytically effective amount of oil-miscible, preferably oil-soluble, compound, typically of a metal of Group IV-B, V-B, VI-B, VII-B or VIII of the Periodic Table, is added to the charge hydrocarbon oil, preferably prior to hydroconversion. When the metal is a Group IV-B metal, it may be titanium (Ti), zirconium (Zr), or hafnium (Hf). When the metal is a Group V-B metal, it may be vanadium (V), niobium (Nb), or tantalum (Ta). When the metal is a Group VI-B metal, it may be chromium (Cr), molybdenum (Mo), or tungsten (W). When the metal is a Group VII-B metal, it may be manganese (Mn) or rhenium (Re). When the metal is a Group VIII metal, it may be a non-noble metal such as iron (Fe), cobalt (Co), or nickel (Ni) or a noble metal such as ruthenium (Ru), rhodium (Rh), palladium (Pd), osmium (Os), iridium (Ir), or platinum (Pt). Preferably the metal is a Group VI-B metal, and most preferably molybdenum (Mo).

Typical oil-miscible or oil-soluble compounds include, among others, one or mixtures of the following: metal salts of aliphatic carboxylic acids like molybdenum stearate, molybdenum palmitate, molybdenum myristate and molybdenum octoate; metal salts of naphthenic carboxylic acids like cobalt naphthenate, iron naphthenate and molybdenum naphthenate; metal salts of alicyclic carboxylic acids like molybdenum cyclohexane carboxylate; metal salts of aromatic carboxylic acids like cobalt benzoate, cobalt o-methyl benzoate, cobalt m-methyl benzoate, cobalt phthalate and molybdenum p-methyl benzoate; metal salts of sulfonic acids like molybdenum benzene sulfonate, cobalt p-toluene sulfonate and iron xylene sulfonate; metal salts of sulfinic acids like molybdenum benzene sulfinate and iron benzene sulfinate; metal salts of phosphoric acids like molybdenum phenyl phosphate; metal salts of mercaptans like iron octyl mercaptide and cobalt hexyl mercaptide; metal salts of phenols like cobalt phenolate and iron phenolate; metal salts of polyhydroxy aromatic compounds like iron catecholate and molybdenum resorcinate; organo metallic compounds like molybdenum hexacarbonyl, iron hexacarbonyl and cyclopentadienyl molybdenum tricarbonyl; metal chelates like ethylene diamine tetra carboxylic acid-di-ferrous salt; and metal salts of organic amines like cobalt salt of pyrrole; and the like. Preferred compounds include cobalt naphthenate, molybdenum hexacarbonyl, molybdenum naphthenate, molybdenum octoate, and molybdenum hexanoate.

The metal compounds to be employed are oil-miscible and preferably oil-soluble, in that they are readily dispersible, and preferably soluble, in the charge hydrocarbon oil in amount of at least 0.01 g/100 g typically 0.025–0.25 g/100 g, say about 0.1 g/100 g. The metal compounds, when activated as hereinafter set forth, are also oil-miscible in the hydrocarbon oils during the hydroconversion process.

The oil-miscible compound is generally present in small amounts, typically about 60 wppm or less, of metal, say 10–60 wppm based on hydrocarbon oil to be hydroconverted, unexpected results may be achieved. It is unexpectedly found, if the noted amount is 15–60, preferably 15–45, most preferably 15 wppm, that the cumulative pore volume of the catalyst is improved. Specifically, the cumulative pore volume increases generally at least about 1%, preferably from about 5% to about 50% or more, say 31%, when compared to the baseline pore volume in the absence of oil-miscible compound.

Conversion is calculated from the ratio of the percentage of 1,000° F.+ material in the feed minus the percentage of 1,000° F.+ material in the product divided by the percentage of 1,000° F.+ material in the feed.

The level of miscible metal, in the 15–60 wppm range, which will be employed will depend upon the particular charge to the ebullated bed and the desired cumulative pore volume for the catalyst. In any instance, an economic study will permit a ready determination of the desired level of metal to be employed.

The oil-miscible compound may be added by any effective means, such as a solution or mixture thereof with a highly aromatic heavy oil. The highly aromatic heavy oil which may be employed, typically those oils which contain sulfur such as a heavy cycle gas oil (HCGO), may be characterized as follows:

|  | Broad | Narrow | Typical |
| --- | --- | --- | --- |
| API Gravity Temperature, °F. | −5 to 20 | 0–10 | 2 |
| ibp | 500–1,000 | 650–850 | 650 |
| 50% | 800–900 | 825–875 | 850 |
| ep | 1,000–1,200 | 1,000–1,100 | 1,050 |
| Aromatics Content, wt % | 25–90 | 30–85 | 85 |
| Sulfur Content, wt % | 0.5–5 | 2–4 | 3.5 |

Illustrative highly aromatic heavy oils which may be employed may include:

| A - Heavy Cycle Gas Oil | |
| --- | --- |
| API Gravity Temperature, °F. | −3.0 |
| ibp | 435 |
| 10% | 632 |
| 50% | 762 |
| 90% | 902 |
| ep | 1,056 |
| Aromatics Content, wt % | 85 |
| Sulfur Content, wt % | 2.5–3.5 |
| B - MP Extract | |
| API Gravity Temperature, °F. | 8 |
| ibp | 600 |
| ep | 1,000 |
| Aromatics Content, wt % | 50–90 |
| Sulfur Content, wt % | 3 |
| C - Decant Oil | |
| API Gravity Temperature, °F. | −2.7 |
| ibp | 525 |
| 10% | 708 |
| 50% | 935 |
| 90% | 975 |
| ep | 1,100 |
| Aromatics Content, wt % | 80 |
| Sulfur Content, wt % | 1.75 |

The oil-miscible compound may be added in an amount to form a solution or mixture with the heavy oil typically of about 0.01–0.04 wt %, preferably about 0.01–0.03 wt %, say 0.02 wt %. The compound may be added to the heavy oil and stored and used in such form. When this is added to the charge hydrocarbon oil to hydrotreating, the amount added may be about 5–20 wt %, preferably about 15 wt %, say 13 wt % of solution or mixture which will provide the 10–60 wppm of metal desired to effect the results noted previously. Typically, the oil-miscible compound is added continuously, such as with the charge hydrocarbon. The oil-miscible compound may be added at any stage of the hydroconversion reaction, preferably during the first stage of multi-stage, such as two-stage reactions.

Activation of the oil-miscible compound may be effected either by pre-treatment (prior to hydroconversion) or in situ (during hydroconversion). It is preferred to effect activation in situ in the presence of the hydrogenation catalyst to achieve a highly dispersed catalytic species.

Activation according to the preferred method may be carried out by adding metal compound, in amount to provide desired metal content, to charge hydrocarbon at about 60° F.–300° F., say 200° F. The mixture is activated by heating to about 400° F.–835° F., typically about 500° F.–700° F., say 600° F. at partial pressure of hydrogen of about 500–5,000 psig, typically about 1,000–3,000 psig, say 2,000 psig and at partial pressure of a gaseous mercaptan of about 5–500 psig, typically about 10–300 psig, say 50 psig. Total pressure may be about 500–5,500 psig, typically about 1,000–3,300 psig, say 2,650 psig. Commonly the gas may contain about 40–99 vol %, typically about 90–99 vol %, say 98 vol % hydrogen and about 1–10 vol %, say 2 vol % mercaptan, such as hydrogen sulfide. The time for conducting activation may be about 1–12, typically about 2–6, say 3 hours. Activation may occur at a temperature which is lower than the temperature of conversion.

The mercaptans which may be employed may include, among others, one or more: hydrogen sulfide; aliphatic mercaptans, typified by methyl mercaptan, lauryl mercaptan, and the like; aromatic mercaptans; dimethyl disulfide; carbon disulfide; and the like. These mercaptans apparently decompose during the activation process. It is not clear why this treatment activates the metal compound. It may be possible that the activity is generated as a result of metal sulfides formed during the treatment.

When the sulfur content of the charge hydrocarbon is above about 2 wt %, it may not be necessary to add a mercaptan during activation since hydrodesulfurization of the charge may provide enough mercaptan to properly activate, meaning sulfide, the oil-miscible decomposable compound.

It is possible to activate the oil-miscible metal compound in the solution or mixture with the heavy aromatic oil. Activation may be effected under the same conditions as are used when activation is carried out in the charge stream. The compatible oil containing the now activated metal may be admitted to the charge stream in amount sufficient to provide therein activated oil-miscible metal compound in desired amount.

In still another embodiment, activation may be carried out by subjecting the charge hydrocarbon oil containing the oil-miscible compound to hydroconversion conditions including temperature of about 700° F.–850° F., preferably about 750° F.–810° F., say 800° F. at hydrogen partial pressure of about 500–5,000 psig, preferably about 1,500–2,000 psig, say 2,000 psig, in the presence of a mercaptan but in the absence of heterogeneous hydroconversion catalyst.

In the preferred embodiment, activation may be carried out during hydroconversion in the presence of the heterogeneous, hydroconversion catalyst, hydrogen, and mercaptan.

Hydroconversion is carried out in the presence of solid heterogeneous catalyst generally containing, as a hydrogenating component, a metal of Group IV-B, V-B, VI-B, VII-B, or VIII on a porous support which may typically contain carbon or metal oxide, such as of aluminum, silicon, titanium, magnesium, zirconium or the like. Preferably, the catalyst may contain a metal of Group VI-B and VIII, typically nickel and molybdenum. When the metal is a Group IV-B metal, it may be titanium (Ti) or zirconium (Zr). When the metal is a Group V-B metal, it may be vanadium (V), niobium (Nb), or tantalum (Ta). When the metal is a Group VI-B metal, it maybe chromium (Cr), molybdenum (Mo), or tungsten (W). When the metal is a Group VII-B metal, it maybe manganese (Mn) or rhenium (Re). When the metal is a Group VIII metal, it may be a non-noble metal such as iron (Fe), cobalt (Co), or nickel (Ni) or a noble metal such as ruthenium (Ru), rhodium (Rh), palladium (Pd), osmium (Os), iridium (Ir), or platinum (Pt).

The solid heterogeneous catalyst may also contain, as a promoter, a metal of Groups I-A, I-B, II-A, II-B, or V-A. When the promoter is a metal of Group I-A, it may preferably be sodium (Na) or potassium (K). When the promoter is a metal of Group IB, it may preferably be copper (Cu). When the promoter is a metal of Group II-A, it may be beryllium (Be), magnesium (Mg), calcium (Ca), strontium (Sr), barium (Ba), or radium (Ra). When the promoter is a metal of Group II-B, it may be zinc (Zn), cadmium (Cd), or mercury (Hg). When the promoter is a metal of Group IV-B, it may be titanium (Ti), zirconium (Zr), or hafnium (Hf). When the promoter is a metal of Group V-A, it may preferably be arsenic (As), antimony (Sb), or bismuth (Bi).

The hydrogenating metal may be loaded onto the solid heterogeneous catalyst by any effective, including known, technique, such as by immersing the catalyst support in solution, say ammonium heptamolybdate, for about 2–24 hours, say 24 hours, followed by drying at about 60° F.–300° F., say 200° F., for about 1–24 hours, say 8 hours, and calcining for about 1–24 hours, say 3 hours, at about 750° F.–1,100° F., say 930° F.

The promoter metal may be loaded onto the solid heterogeneous catalyst by any effective, including known, technique, such as by immersing the catalyst support, preferably bearing the calcined hydrogenating metal—although they may be added simultaneously or in any order, in solution, of for example bismuth nitrate, for about 2–24 hours, say 24 hours, followed by drying at about 60° F.–300° F., say 200° F. for about 1–24 hours, say 3 hours, and calcining at about 570° F.–1,100° F., say 750° F. for about 1–12 hours, say 3 hours.

Fresh, solid heterogenous catalyst employed in the method of this invention may be characterized by a total pore volume of about 0.2–1.2 cc/g, say 0.77 cc/g; a surface area of about 50–500 m$^2$/g, say 280 m$^2$/g; and a pore size distribution as follows:

| Pore Diameter, Å | Volume cc/g |
| --- | --- |
| 30–100 | 0.15–0.8, say 0.42 |
| 100–1000 | 0.10–0.50, say 0.19 |
| 1,000–10,000 | 0.01–0.40, say 0.16 |

In another embodiment, it may have a pore size distribution as follows:

| Pore Diameter, Å | Pore Volume, cc/g | Typical |
| --- | --- | --- |
| >250 | 0.12–0.35 | 0.28 |
| >500 | 0.11–0.29 | 0.21 |
| >1,500 | 0.08–0.26 | 0.19 |
| >4,000 | 0.04–0.18 | 0.11 |

The solid heterogeneous catalyst typically may contain about 4–30 wt %, say 9.5 wt % Mo, about 0–6 wt %, say 3.1 wt % Ni and about 0–6 wt %, say 3.1 wt % of promoter metal, say bismuth. Liquid hourly space velocity (LHSV) in the hydroconversion reactors may be about 0.1–2, say 0.7. Preferably, the heterogeneous catalyst may be employed in the form of extrudates of diameter of 0.7–6.5 mm, say 1 mm and of length of 0.2–25 mm, say 5 mm.

Although it is possible to carry out hydroconversion in a fixed bed, a moving bed, a fluidized bed, or a well-stirred reactor, it is found that the advantages of this invention may be most apparent when hydroconversion is carried out in an ebullated bed. Hydroconversion may be carried out in one or more beds. It is found that the active form of the catalyst is formed in or accumulates in the first of several reactors and accordingly increases in conversion and heteroatom removal activities appear principally to occur in the first of several reactors.

Effluent from hydroconversion is typically characterized by an increase in the content of liquids boiling below 1,000° F. Commonly the wt % conversion of the 1,000° F.+ boiling material is about 30%–90%, say 67% which is typically about 5%–25%, say 12% better than is attained by prior art techniques.

It is a feature of this invention that it permits attainment of improved removal of sulfur (HDS Conversion), of nitrogen (HDN Conversion), and of metals (HDNi and HDV Conversion). Typically, HDS Conversion may be about 30–90%, say 65% which is about 1%–10%, say 4% higher than the control runs. Typically, HDN Conversion may be about 20%–60%, say 45% which is about 1%–10%, say 4% higher than control runs. Typically, HDNi plus HDV Conversion may be about 70%–99%, say 90% which is about 5%–20%, say 13% higher than control runs.

This invention provides improved solid heterogeneous catalyst having (1) hydrocarbonaceous deposits having a higher ratio of hydrogen to carbon than is produced when operating outside the conditions of this invention; as well as (2) a correspondingly greater cumulative pore volume. The addition of oil-miscible compound with hydrocarbon oil permits the attainment of hydrocarbonaceous deposits characterized by a hydrogen to carbon ratio typically up to about 30% greater than those obtained in the absence of oil-miscible compound. Typically, the hydrogen to carbon ratio may increase from a base ratio of about 0.062 to an experimental ratio as high as about 0.0885.

Increased total pore volume will increase the activity of the aged catalyst in situ since the number of micropores are increased when compared to the baseline catalyst. This increase in micropores will increase the ability of the catalyst to perform hydrogenation reactions, such as sulfur removal.

The following examples illustrate some embodiments of this invention and are not intended to limit its scope. All percentages and amounts given in the disclosure and claims are based on weight, unless otherwise stated.

EXAMPLES

EXAMPLE 1C-5

In these Examples the oil miscible compound is molybdenum naphthenate added in an amount to provide from 15 to 60 wppm molybdenum in the feed to the unit. The feedstock is a blend of (i) vacuum resid, (ii) visbreaker bottoms, (iii) vacuum bottoms recycle (iv) and heavy cycle gas oil having the following properties:

|  | VR + VB Bottoms | HCGO |
|---|---|---|
| Gravity, API (ASTM D-287) | 4.7 | −3.5 |
| X-Ray Sulfur, wt % (ASTM D-4294) | 5.52 | 3.41 |
| Carbon Residue, wt % (ASTM D-189) | 21.98 | 10.9 |
| Total Nitrogen, wppm (Chemiluminesence) | 4,348 | 1,582 |
| CHN Analysis, wt % (Leco Combustion Analysis) | | |
| Carbon | 85.65 | 88.23 |
| Hydrogen | 10.47 | 7.67 |
| Nitrogen | 0.6 | 0.18 |
| Metals, wppm | | |
| V | 170 | |
| Ni | 40.8 | |
| Fe | 15.5 | |
| Cr | 0.2 | |
| Na | 5.5 | |
| Kinematic Viscosity, Cst (ASTM D-445) | | |
| @ 212 Deg F. | 2,368.1 | |
| @ 250 Deg F. | 664.8 | |
| @ 300 Deg F. | 117.1 | |

The mixture of feedstock and heavy cycle gas oil containing the oil-soluble molybdenum naphthenate is admitted at 780°–790° F. and 2,500 psig and 0.39 LHSV. Hydrogen feed is 4,300 SCFB of 92% hydrogen.

The supported catalyst in the ebullated bed is cylinders (0.8 mm diameter and 5 mm length) of commercially available catalyst containing 2.83 wt % nickel and 8.75 wt % molybdenum on alumina, having a surface area of 285.2 m$^2$/g, a total pore volume of 0.78 cc/g, and a pore size distribution of 0.28 cc/g at >250 Å, 0.21 cc/g at >500 Å, 0.19 cc/g at >1,550 Å and 0.11 cc/g at >4,000 Å. The catalyst is activated in situ during hydroconversion.

A base line, prior to oil-miscible compound addition, analysis of the weight ratio of hydrogen to carbon in the hydrocarbonaceous deposits and catalyst porosity, in total pore volume, is taken in Example 1C; and similar determinations are made at the end of each addition, with the results given in Tables I through V.

EXAMPLE 1C

A baseline was run to determine the product qualities as well as the solid catalyst properties prior to adding the liquid molybdenum compounds. The baseline conditions were LHSV of 0.39 based on total feed, reactor temperatures of 780° F. and 790° F., first and second stage respectively, and at a system pressure of 2,500 psig. Daily catalyst withdrawals were conducted to maintain the catalyst inventory at the required age. After 5 test periods, each one 24 hours apart, a portion of the withdrawn catalyst was submitted for analyses to determine pore volume, carbon, hydrogen, sulfur as well as other qualities to develop a reference point for comparison purposes. Baseline data indicated the equilibrated, solid heterogenous catalyst had a H/C ratio of 0.062 in the first stage reactor and 0.0574 in the second stage reactor. Surface area for the baseline case was approximately 95 m$^2$/g.

EXAMPLE 2

Molybdenum naphthenate is mixed with heavy cycle gas oil in amounts to result in 15 ppm molybdenum in the fresh feed to the reactor. The feedstock consists of a blend of vacuum resid, visbroken bottoms, and vacuum bottoms recycle. The molybdenum naphthenate is fed to the process for 9 successive days. Catalyst withdrawals are conducted daily. The catalyst withdrawn from day 9 is submitted for analysis. Comparisons between the analyses from day 9 and the baseline indicate increasing amounts of carbon, molybdenum, vanadium and sulfur depositing on the surface of the catalyst when the molybdenum is injected. Comparisons between the hydrogen to carbon weight ratio for the baseline catalyst and the catalyst that is withdrawn for the first stage, show an increase over the baseline ratio by 29.9%. The hydrogen to carbon weight ratio in the second stage increases by 7.7%. This indicates that the coke formed on the catalyst contains a higher amount of hydrogen than that of the baseline. HDS MAT activity test shows increased sulfur removal for the catalyst withdrawn during the 15 ppm injection for both stages.

EXAMPLE 3

Molybdenum naphthenate is mixed with heavy cycle gas oil in amounts to result in 30 ppm molybdenum in the fresh feed to the reactor. The feedstock consists of a blend of vacuum resid, visbroken bottoms, and vacuum bottoms recycle. The molybdenum naphthenate is fed to the process for 8 successive days. Catalyst withdrawals are conducted daily. The catalyst withdrawn from day 8 is submitted for analysis. Comparisons between the analyses from day 8 and the baseline indicate increasing amounts of carbon, molybdenum and sulfur depositing on the surface of the catalyst when the molybdenum is injected. The hydrogen to carbon weight ratio in the first and second stages was higher than the baseline ratio by 18.8 and 2.9% respectively. This indicates increased hydrogen loading in the coke formed on the catalyst. HDS MAT activity tests shows a drop in sulfur removal when compared to the MAT activity for Example 2.

EXAMPLE 4

Molybdenum naphthenate is mixed with heavy cycle gas oil in amounts to result in 45 ppm molybdenum in the fresh feed to the reactor. The feedstock consists of a blend of vacuum resid, visbroken bottoms, and vacuum bottoms recycle. The molybdenum naphthenate is fed to the process for 4 successive days. Catalyst withdrawals are conducted daily. The catalyst withdrawn from day 8 is submitted for analysis. Comparisons between the analyses from day 4 and the baseline indicated increasing amounts of carbon, molybdenum, vanadium and sulfur depositing on the surface during the period the molybdenum is injected. The hydrogen to carbon weight ratio in the first and second stages increases over the baseline by 20.7 and 2.9% respectively. This would indicate higher levels of hydrogen in the coke formed on the catalyst.

EXAMPLE 5

Molybdenum naphthenate is mixed with heavy cycle gas oil in amounts to result in 60 ppm molybdenum in the fresh feed to the reactor. The feedstock consists of a blend of vacuum resid, visbroken bottoms, and vacuum bottoms recycle. The molybdenum naphthenate is fed to the process for 11 successive days. Catalyst withdrawals are conducted daily. The catalyst withdrawn from day 11 is submitted for analysis. Comparisons between the analyses from day 11 and the baseline indicate increasing amounts of carbon, molybdenum, vanadium and sulfur depositing on the catalyst surface during the period of molybdenum injection. The hydrogen to carbon weight ratio in the first stage decreases by 4.4% when compared to the baseline. The hydrogen to carbon weight ratio on the second stage catalyst actually increases by 10% over the baseline. It would appear that the coke formed in the first stage during the 60 ppm injection period was of the same type as would normally be formed during resid hydrotreating operations. The second stage catalyst might not have been affected as much since the molybdenum was injected into the first stage only.

TABLE I

FIRST STAGE CATALYST WITHDRAWALS

| Mo, ppm | C* | H* | N* | S* | Mo | H/C | H/C % Increase over Baseline |
|---|---|---|---|---|---|---|---|
| 0 | 22.2 | 1.38 | 0.28 | 10.3 | 6.36 | 0.062 | — |
| 15 | 14.8 | 1.31 | 0.30 | 11.4 | 5.70 | 0.0885 | 29.9 |
| 30 | 19.4 | 1.48 | 0.22 | 10.7 | 6.76 | 0.0764 | 18.8 |
| 45 | 15.9 | 1.24 | 0.33 | 11.5 | 5.96 | 0.0782 | 20.7 |
| 60 | 28.6 | 1.70 | 0.24 | 9.67 | 8.08 | 0.0594 | −4.4 |

* — Wt %, using LECO Carbon—Hydrogen—Nitrogen—Sulfur Analyzer

TABLE II

FIRST STAGE ELEMENTAL RATIOS ON EXTERIOR SURFACE OF WITHDRAWN CATALYST*

| Mo, wppm | Ni/Al | Mo/Al | V/Al | C/Al | S/Al |
|---|---|---|---|---|---|
| 0 | 0.0 | 0.121 | 0.145 | 25.423 | 1.693 |
| 15 | 0.125 | 0.650 | 0.334 | 51.264 | 5.169 |
| 30 | 0.0 | 1.911 | 0.0 | 117.724 | 10.267 |
| 45 | 0.0 | 0.841 | 0.217 | 44.854 | 5.614 |
| 60 | 0.0 | 0.996 | 0.0 | 100.231 | 4.968 |

* — Using x-ray photoelectron spectroscopy (XPS analysis)

TABLE III

SECOND STAGE CATALYST WITHDRAWALS

| Mo, ppm | C* | H* | N* | S* | Mo | H/C | H/C % Increase over Baseline |
|---|---|---|---|---|---|---|---|
| 0 | 26.0 | 1.49 | 0.37 | 7.13 | 6.73 | 0.0574 | — |
| 15 | 21.7 | 1.35 | 0.36 | 8.56 | 6.69 | 0.0622 | 7.7 |
| 30 | 26.4 | 1.56 | 0.30 | 8.16 | 6.37 | 0.0591 | 2.9 |
| 45 | 23.4 | 1.38 | 0.45 | — | 6.98 | 0.0590 | 2.9 |
| 60 | 24.8 | 1.58 | 0.31 | 8.33 | 6.62 | 0.0638 | 10.0 |

* — Wt %, using LECO Carbon—Hydrogen—Nitrogen—Sulfur Analyzer

TABLE IV

SECOND STAGE ELEMENTAL RATIOS ON EXTERIOR SURFACE OF WITHDRAWN CATALYST

| Mo, wppm | Ni/Al | Mo/Al | V/Al | C/Al | S/Al |
|---|---|---|---|---|---|
| 0 | 0.0 | 0.086 | 0.194 | 41.272 | 2.338 |
| 15 | 0.0 | 0.238 | 0.376 | 32.286 | 3.074 |
| 30 | 0.037 | 0.196 | 0.226 | 42.814 | 2.893 |
| 45 | 0.0 | 0.184 | 0.248 | 27.187 | 2.263 |
| 60 | 0.0 | 0.209 | 0.163 | 24.606 | 1.853 |

* — Using x-ray photoelectron spectroscopy (XPS analysis)

TABLE V

| Pore Diameter Interval (Å) | Average Pore Diameter (Å) | Percentage Area (m²/g) Increase Over Baseline | | | | | | | |
|---|---|---|---|---|---|---|---|---|---|
| | | Oil-Miscible Compound Metal Concentration | | | | | | | |
| | | 15 ppm | | 30 ppm | | 45 ppm | | 60 ppm | |
| Stage: | | First | Second | First | Second | First | Second | First | Second |
| 30–45 | 38 | 37.82 | 24.24 | 22.83 | 29.31 | 40.00 | 16.67 | 4.00 | 8.33 |
| 45–67 | 56 | 35.50 | 28.79 | 25.34 | 33.80 | 39.44 | 23.95 | 8.79 | 14.55 |
| 67–83 | 75 | 33.66 | 21.23 | 24.07 | 28.12 | 36.14 | 20.69 | 6.82 | 6.12 |
| 83–100 | 91.5 | 30.80 | 24.56 | 23.08 | 28.33 | 33.33 | 19.78 | 4.76 | 6.52 |
| 100–200 | 150 | 28.85 | 21.57 | 22.92 | 26.74 | 32.73 | 17.36 | 5.13 | 6.98 |
| 200–300 | 250 | 27.08 | 22.59 | 23.91 | 27.45 | 32.43 | 19.57 | 2.78 | 5.13 |
| 300–400 | 350 | 25.44 | 22.87 | 22.37 | 28.33 | 30.61 | 20.00 | 0.00 | 8.99 |
| 400–500 | 450 | 27.27 | 23.70 | 22.33 | 30.00 | 31.91 | 19.10 | 3.03 | 10.56 |
| 500–600 | 550 | 26.67 | 22.44 | 22.61 | 27.73 | 30.32 | 18.46 | 3.75 | 6.47 |
| 600–700 | 650 | 29.50 | 23.59 | 25.79 | 29.05 | 34.42 | 21.58 | 6.00 | 6.88 |
| 700–1000 | 850 | 26.46 | 25.93 | 22.78 | 29.29 | 30.50 | 22.22 | 4.14 | 6.67 |
| 1000–10000 | 5500 | 41.03 | 50.00 | 42.50 | 50.00 | 54.00 | 48.72 | 48.89 | 28.57 |

We claim:

1. A process for catalytically hydroconverting hydrocarbon oil which comprises:

(a) contacting hydrocarbon oil containing a substantial quantity of high boiling compounds, boiling above about 538° C., in a conversion zone with (1) solid heterogenous catalyst containing hydrotreating metal on a porous support said catalyst characterized by a total pore volume of about 0.2–1.2 cc/g; a surface area of about 50–500 m$^2$/g; and a pore size distribution as follows:

| Pore Diameter, Å | Volume cc/q |
|---|---|
| 30–100 | 0.15–0.8 |
| 100–1000 | 0.10–0.50 |
| 1,000–10,000 | 0.01–0.40 | and (2) oil-miscible compound comprising an effective porosity modifying amount of metal compound selected from the group consisting of molybdenum hexacarbonyl, molybdenum naphthenate, molybdenum octoate, or molybdenum hexanoate;

(b) converting a substantial portion of high boiling compounds in the hydrocarbon oil at conversion conditions in the presence of hydrogen and mercaptan to low boiling compounds, boiling below about 538° C., to make hydrocarbon oil containing a substantial portion of low boiling point compounds; and (c) producing solid heterogeneous catalyst with: (1) hydrocarbonaceous deposits having a higher ratio of hydrogen to carbon; and (2) a greater total pore volume; than is correspondingly produced in the absence of the oil-miscible compound.

2. The process of claim 1 wherein the oil-miscible compound is soluble in the hydrocarbon oil in amount of at least 0.01 g/100 g.

3. The process of claim 1 wherein oil-miscible compound provides metal in amount of from about 15 to about 60 wppm.

4. The process of claim 1 wherein oil-miscible compound is present in an amount whereby conversion of high boiling compounds to low boiling compounds is increased.

5. The process of claim 1 conducted using ebullating catalyst.

6. The process of claim 1 in which catalyst is withdrawn to maintain the age of the processing catalyst.

7. A process for increasing the effective porosity of a solid heterogeneous catalyst in situ while catalytically hydroconverting hydrocarbon oil which comprises:

(a) contacting hydrocarbon oil containing a substantial quantity of high boiling compounds, boiling above about 538° C., in a conversion zone with (1) solid heterogenous catalyst containing hydrotreating metal on a porous support said catalyst characterized by a total pore volume of about 0.2–1.2 cc/g; a surface area of about 50–500 m$^2$/g; and a pore size distribution as follows:

| Pore Diameter, Å | Volume cc/q |
|---|---|
| 30–100 | 0.15–0.8 |
| 100–1000 | 0.10–0.50 |
| 1,000–10,000 | 0.01–0.40 | and (2) oil-miscible compound comprising an effective porosity modifying amount of metal compound selected from the group consisting of molybdenum hexacarbonyl, molybdenum naphthenate, molybdenum octoate, or molybdenum hexanoate;

(b) converting a substantial portion of high boiling compounds in the hydrocarbon oil at conversion conditions in the presence of hydrogen and mercaptan to low boiling compounds, boiling below about 538° C., to make hydrocarbon oil containing a substantial portion of low boiling point compounds; and (c) producing solid heterogeneous catalyst with: (1) hydrocarbonaceous deposits having a higher ratio of hydrogen to carbon; and (2) a greater total pore volume; than is correspondingly produced in the absence of the oil-miscible compound.

8. The process of claim 7 wherein the oil-miscible compound is soluble in the hydrocarbon oil in amount of at least 0.01 g/100 g.

9. The process of claim 7 wherein oil-miscible compound provides metal in amount of from about 15 to about 60 wppm.

10. The process of claim 7 wherein oil-miscible compound is present in an amount whereby conversion of high boiling compounds to low boiling compounds is increased.

11. The process of claim 7 conducted using ebullating catalyst.

12. The process of claim 7 in which catalyst is withdrawn to maintain the age of the processing catalyst.

* * * * *

UNITED STATES PATENT AND TRADEMARK OFFICE
CERTIFICATE OF CORRECTION

PATENT NO. : 5,622,616
DATED : April 22, 1997
INVENTOR(S) : Porter et al

It is certified that error appears in the above-indentified patent and that said Letters Patent is hereby corrected as shown below:

On the title page, item [73] Assignee:

"Texaco Development Corporation, White Plains, N.Y." should be

-- TEXACO INC., White Plains, N.Y. --.

Signed and Sealed this

Sixteenth Day of September, 1997

Attest:

BRUCE LEHMAN

Attesting Officer            Commissioner of Patents and Trademarks